US008605653B2

(12) United States Patent  
Nagpal et al.

(10) Patent No.: US 8,605,653 B2  
(45) Date of Patent: Dec. 10, 2013

(54) UTILIZING EMERGENCY PROCEDURES TO DETERMINE LOCATION INFORMATION OF A VOICE OVER INTERNET PROTOCOL DEVICE

(75) Inventors: Ashish Nagpal, Bangalore (IN); Ashish Sharma, Bangalore (IN)

(73) Assignee: Sonus Networks, Inc., Westford, MA (US)

( * ) Notice: Subject to any disclaimer, the term of this patent is extended or adjusted under 35 U.S.C. 154(b) by 268 days.

(21) Appl. No.: 12/824,909

(22) Filed: Jun. 28, 2010

(65) Prior Publication Data

US 2011/0292870 A1 Dec. 1, 2011

(30) Foreign Application Priority Data

May 28, 2010 (IN) .......................... 1641/MUM/2010

(51) Int. Cl.
*H04L 29/02* (2006.01)
(52) U.S. Cl.
USPC ........................................................... 370/328
(58) Field of Classification Search
CPC ....................................................... H04W 4/02
USPC ............................... 370/328; 455/456.1–456.6
See application file for complete search history.

(56) References Cited

U.S. PATENT DOCUMENTS

| | | | | |
|---|---|---|---|---|
| 7,068,644 B1 * | 6/2006 | McConnell et al. | ........... | 370/352 |
| 7,197,322 B1 * | 3/2007 | Rayburn et al. | ............. | 455/456.1 |
| 7,463,613 B2 * | 12/2008 | Sylvain | ........................... | 370/338 |
| 7,600,690 B1 * | 10/2009 | Gailloux | .................. | 235/462.46 |
| 7,613,155 B2 * | 11/2009 | Shim | ............................... | 370/338 |
| 7,773,584 B2 * | 8/2010 | Gorti et al. | ..................... | 370/352 |
| 7,912,446 B2 * | 3/2011 | Zhu et al. | ..................... | 455/404.1 |
| 7,940,896 B2 * | 5/2011 | Prozeniuk et al. | .............. | 379/45 |
| 8,027,321 B2 * | 9/2011 | Zheng | ............................ | 370/338 |
| 8,116,291 B2 * | 2/2012 | Annamalai et al. | ........... | 370/338 |
| 8,135,378 B2 * | 3/2012 | Yasrebi et al. | ............. | 455/404.1 |
| 8,155,109 B2 * | 4/2012 | Mitchell | ........................ | 370/352 |
| 8,169,315 B2 * | 5/2012 | Smith et al. | .................... | 340/525 |
| 2007/0027997 A1 * | 2/2007 | Polk | .............................. | 709/230 |
| 2007/0076696 A1 | 4/2007 | An et al. | | |
| 2008/0192770 A1 | 8/2008 | Burrows et al. | | |
| 2008/0228654 A1 * | 9/2008 | Edge | ................................ | 705/71 |
| 2008/0261619 A1 * | 10/2008 | Hines et al. | ................. | 455/456.1 |
| 2009/0003296 A1 * | 1/2009 | Zheng | ............................ | 370/338 |
| 2009/0067399 A1 * | 3/2009 | McConnell et al. | .......... | 370/338 |
| 2009/0073031 A1 * | 3/2009 | Kim | .............................. | 342/357.1 |
| 2010/0136947 A1 * | 6/2010 | Yoo et al. | .................... | 455/404.2 |
| 2010/0178935 A1 * | 7/2010 | Jang et al. | .................. | 455/456.1 |
| 2010/0278125 A1 * | 11/2010 | Clair et al. | .................... | 370/329 |
| 2011/0165892 A1 * | 7/2011 | Ristich et al. | .............. | 455/456.2 |
| 2011/0250875 A1 * | 10/2011 | Huang et al. | .................. | 455/418 |
| 2011/0269477 A1 * | 11/2011 | Annamalai et al. | ........ | 455/456.1 |
| 2011/0292870 A1 * | 12/2011 | Nagpal et al. | .............. | 370/328 |

\* cited by examiner

*Primary Examiner* — Ricky Ngo
*Assistant Examiner* — Ben H Liu
(74) *Attorney, Agent, or Firm* — Straub & Pokotylo; Michael P. Straub; Stephen T. Straub

(57) ABSTRACT

Described are methods and apparatuses, including computer program products for utilizing emergency procedures to determine location information for a Voice Over Internet Protocol (VOIP) device. A wireless access gateway (WAG) determines location information of the VOIP device and stores the location information. A request for a location of the VOIP device from a Mobile Switching Center (MSC) is received by the WAG. The WAG translates the stored location information into a format used by the MSC to receive location information from a Radio Access Network (RAN). The WAG provides the translated location information to the MSC.

20 Claims, 5 Drawing Sheets

UTILIZING EMERGENCY PROCEDURES TO DETERMINE LOCATION INFORMATION OF A VOICE OVER INTERNET PROTOCOL DEVICE

CROSS-REFERENCE TO RELATED APPLICATIONS

This application claims the benefit of and priority to Indian Patent Application No. 1641/MUM/2010, filed on May 28, 2010, filed in the Indian Patent Office. The disclosure of the above application is incorporated herein by reference it its entirety.

FIELD OF THE INVENTION

The invention relates generally to computer-based methods and apparatuses, including computer program products, for a Mobile Switching Center (MSC) to utilize emergency procedures to determine location information for a Voice Over Internet Protocol (VOIP) device that is connected to the MSC by a Wireless Access Gateway (WAG).

BACKGROUND

Automatically determining the location of a caller during an emergency is crucial to the function of an emergency calling system. Thus, in the United States, the National Emergency Number Association (NENA) released VOIP Enhanced 911 (E911) standards. The VOIP E911 provides a standard for VOIP service providers to determine a physical location of VOIP devices connected to the service provider's network. The VOIP E911 emergency-calling system associates a physical address with the calling party's telephone number. Similarly, in the United Kingdom, NICC released ND1638 VOIP emergency call standards and the European Union released emergency call standards for VOIP emergency calls made within the European Union.

VOIP devices (e.g., phones or computers) transmit phone calls over the internet, typically by using Session Initiation Protocol (SIP) of the Request For Comments (RFC) standards. VOIP devices can also transmit calls over a Global System for Mobile Communication (GSM) mobile phone network by connecting to the GSM via an appropriate interface (e.g., interworking function and/or a gateway). For example, a WAG can translate SIP messages into a format that is understood by a MSC of a GSM. In addition to providing call handling to VOIP devices, the GSM can also provide call services to VOIP devices.

Providing emergency services when a VOIP device is connected to the MSC via a WAG is problematic because an MSC typically receives device location information from a Radio Access Network (RAN), and VOIP devices do not communication with RANs. The MSC has no mechanism for obtaining a VOIP devices location information. Therefore, it is desirable for an MSC to obtain location information of a VOIP device.

SUMMARY OF THE INVENTION

In one aspect, the invention features a method of utilizing emergency procedures to determine location information for a Voice Over Internet Protocol (VOIP) device. The method involves determining, by a wireless access gateway, location information of the VOIP device, storing, by the wireless access gateway, the location information, and receiving, by the wireless access gateway, a request for a location of the VOIP device from a Mobile Switching Center (MSC). The method also involves, translating, by the wireless access gateway, the stored location information into a format used by the MSC to receive location information for a Radio Access Network (RAN), and providing, by the wireless access gateway, the translated location information to the MSC.

In another aspect, the invention features, a computer program product for utilizing emergency procedures to determine location information for a Voice Over Internet Protocol (VOIP) device. The computer program product is operable to cause a wireless access gateway to determine location information of the VOIP device, store the location information, receive a request for a location of the VOIP device from a Mobile Switching Center (MSC), translate the stored location information into a format used by the MSC to receive location information for a Radio Access Network (RAN), and provide, by the wireless access gateway, the translated location information to the MSC.

In another aspect, the invention features, a computer-implemented system for utilizing emergency procedures to determine location information for a Voice Over Internet Protocol (VOIP) device. The computer-implemented system includes means for determining, by a wireless access gateway, location information of the VOIP device, means for storing, by the wireless access gateway, the location information, and means for receiving, by the wireless access gateway, a request for a location of the VOIP device from a Mobile Switching Center (MSC). The computer-implemented system also includes means for translating, by the wireless access gateway, the stored location information into a format used by the MSC to receive location information for a Radio Access Network (RAN), and means for providing, by the wireless access gateway, the translated location information to the MSC.

In some embodiments, the location information is a physical location of the VOIP device. In some embodiments, the location information is a location key. In some embodiments, the method includes querying, by the wireless access gateway, a Location Information Server (LIS) for a physical location of the VOIP device by transmitting the location key to the LIS.

In some embodiments, the stored location information is stored in a format of session initiation protocol's geolocation header. In some embodiments, translating the stored location information involves, interworking the session initiation protocol's geolocation header into at least one of 3GGP TS 48.008's location estimate, positioning data, velocity estimate, or GANSS positioning data. In some embodiments, storing the location information involves receiving a session initiation protocol's geo-priv header from the VOIP device. In some embodiments, determining the location information involves utilizing National Emergency Number Association's enhanced 9-1-1 service for VOIP based network standard. In some embodiments, determining the location information involves utilizing NICC's location for Emergency Calls standard.

In some embodiments, the RAN includes a Base Station Controller (BSC). In some embodiments, the RAN includes a Radio Network Controller (RNC).

The systems and methods of the present invention provide a number of advantages. One advantage of the present invention is that a MSC can obtain location information of a VOIP device, thus allowing a VOIP device connected to a GSM network to include standardized emergency services. Another advantage of embodiments of the present invention is that it makes utilizing GSM networks more accessible to VOIP devices. Another advantage of embodiments of the present invention is that a MSC does not need to be modified to receive location information from VOIP devices because a WAG transmits the location information to the MSC in a format that appears to the MSC as a RAN message (e.g., Base Station Controller (BSC) or Radio Network Controller (RNC)).

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the invention, as well as the invention itself, will be more fully understood from the following description of various embodiments, when read together with the accompanying drawings.

DETAILED DESCRIPTION

In general overview, a location services client can request location information for a VOIP device that is connected to a MSC of a GSM network via a WAG. The MSC sends a request to the WAG for location information of the VOIP device. The MSC's request is in the same format that the MSC uses to request location information from a RAN (e.g., BSC or a RNC). The WAG retrieves the location information or retrieves a location key from its memory. If the WAG retrieves the location key, it queries a Location Information Server (LIS) that provides the WAG with location information based on the location key. The WAG translates the location information into a format used by the MSC to receive location information from a RAN. Thus, the MSC receives location information of a VOIP device and provides the location information to the location services client.

Figure 1:
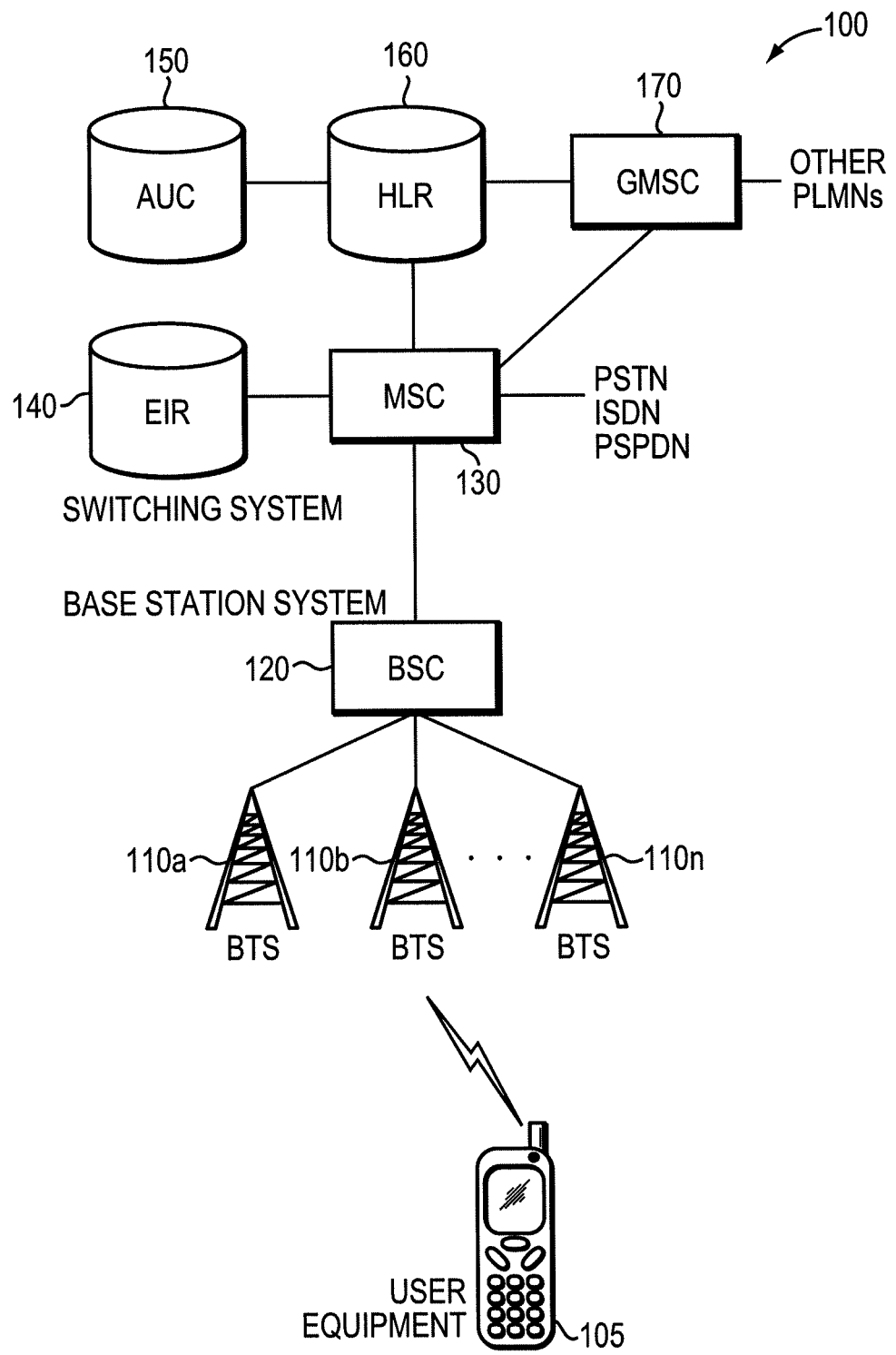
FIG. 1 is block diagram showing an exemplary GSM network.

FIG. 1 is block diagram 100 showing an exemplary GSM network. GSM network can include User Equipment (UE) 105, one or more Base Transceiver Stations (BTS), 110a, 110b, ... 110n, generally 110, a BSC 120 (or RNC), a MSC 130, an Equipment Identity Register (EIR) 140, an Authorization Center (AUC) 150, a Home Location Register (HLR) 160, and a Gateway Mobile Switching Center (GMSC) 170 that interfaces with other Public Land Mobile Networks (PLMN). The GSM network can include other gateways that can act as interfaces between the GSM network and other parts of a public telephone system (e.g., Public Switched Telephone Network (PSTN), Integrated Services Digital Network (ISDN), and Packet Switched Public Data Network (PSPDN)). Communication between GSM network elements is defined by a Third Generation Partnership Project (3GPP) to enable data, speech, and mobile network technology to converge over an Internet Protocol (IP) based infrastructure. One of ordinary skill in the art can appreciate that the GSM network can include many other network elements that are not shown in FIG. 1.

When a UE 105 (e.g., a mobile phone user serviced by a GSM network) dials an emergency number, the UE 105 can recognize that the user has dialed an emergency number. In response, the mobile station 105 directs the call to a Public Safety Answering Point (PSAP) (not shown), for example, a local emergency desk. In the United States, the FCC requires that all emergency calls be routed to an emergency service call center. Once the call is routed to a PSAP, a location of the mobile station 105 is provided by the GSM network to the PSAP.

Figure 2:
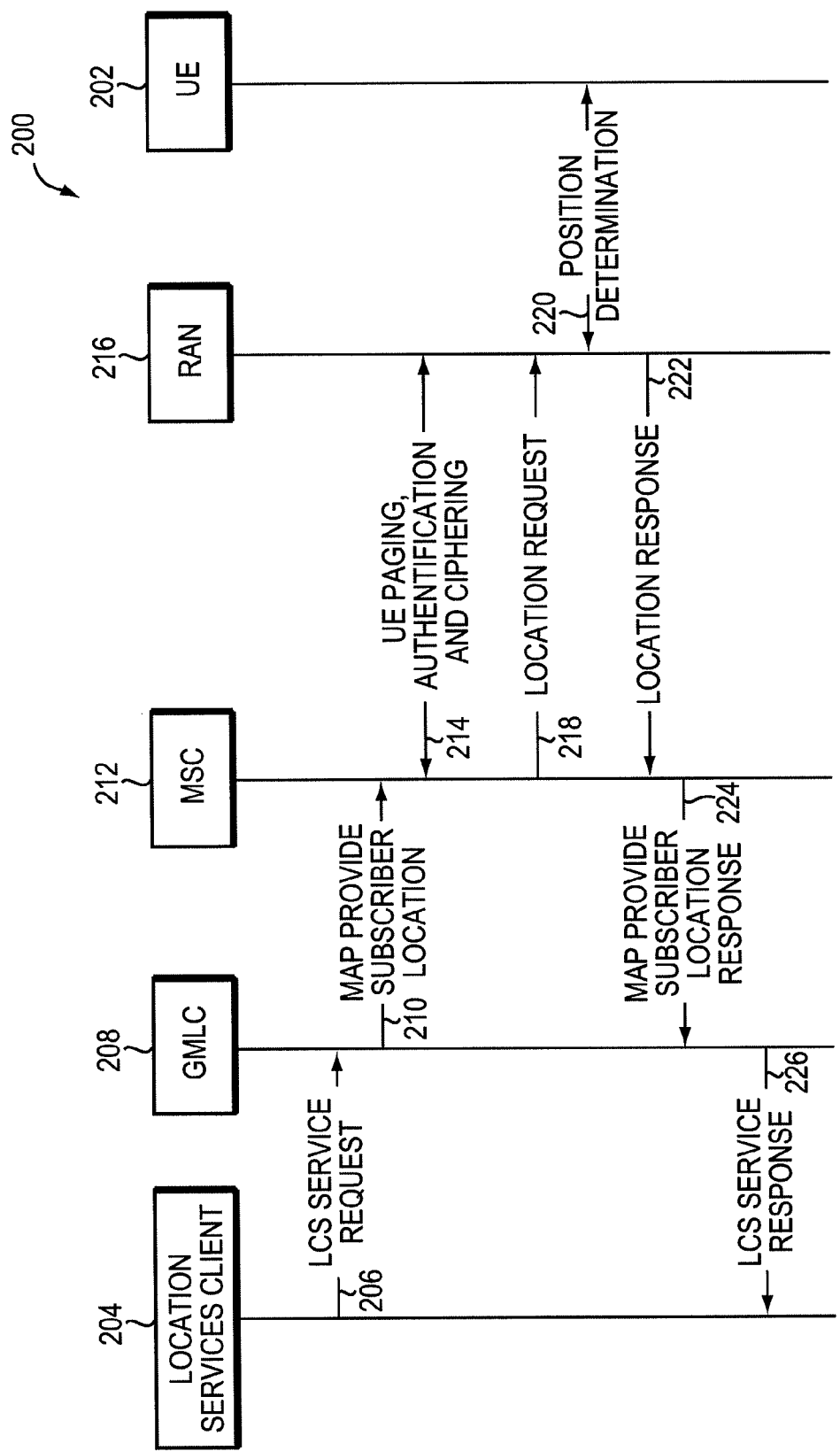
FIG. 2 is a sequence diagram of determining a location of User Equipment (UE) over a GSM network.

FIG. 2 is a sequence diagram 200 of determining a location of User Equipment (UE) 202 over a GSM network (e.g., the GSM network of FIG. 1). A location services client 204 (e.g., location mapping software application for an emergency call center) sends a Location Services (LCS) request 206 to a Gateway Mobile Location Center (GMLC) 208. The GMLC 208 sends a Mobile Application Part (MAP) Provide Subscriber Location request 210 to an MSC 212 that is currently serving the UE 202 to obtain a physical location of the UE 202. If the UE 202 is not currently connected to the MSC 212 (e.g., in an idle mode), then the MSC 212 sends a UE paging, authentication and ciphering request 214 to a RAN 216 so that the UE 202 connects to the RAN 216. The MSC 212 also sends a location request message 218 to the RAN 216 to request the location of the UE 202. The RAN 216 determines a location 220 of the UE 202 by, for example, triangulation or receiving the position from a Global Positioning System (GPS). The RAN 216 sends a location response 222 to the MSC 212. The MSC 212 sends a Map Provider Subscriber Location Response 224 to the GMLC 208, which in turn sends a location service request response 226 to the location services client 204. The communication between the MSC 212 and the RAN 215 can take place through an A or an Iu interface as defined in the 3GPP TS 25.305 and 3GPP TS 43.059 standards.

Figure 3:
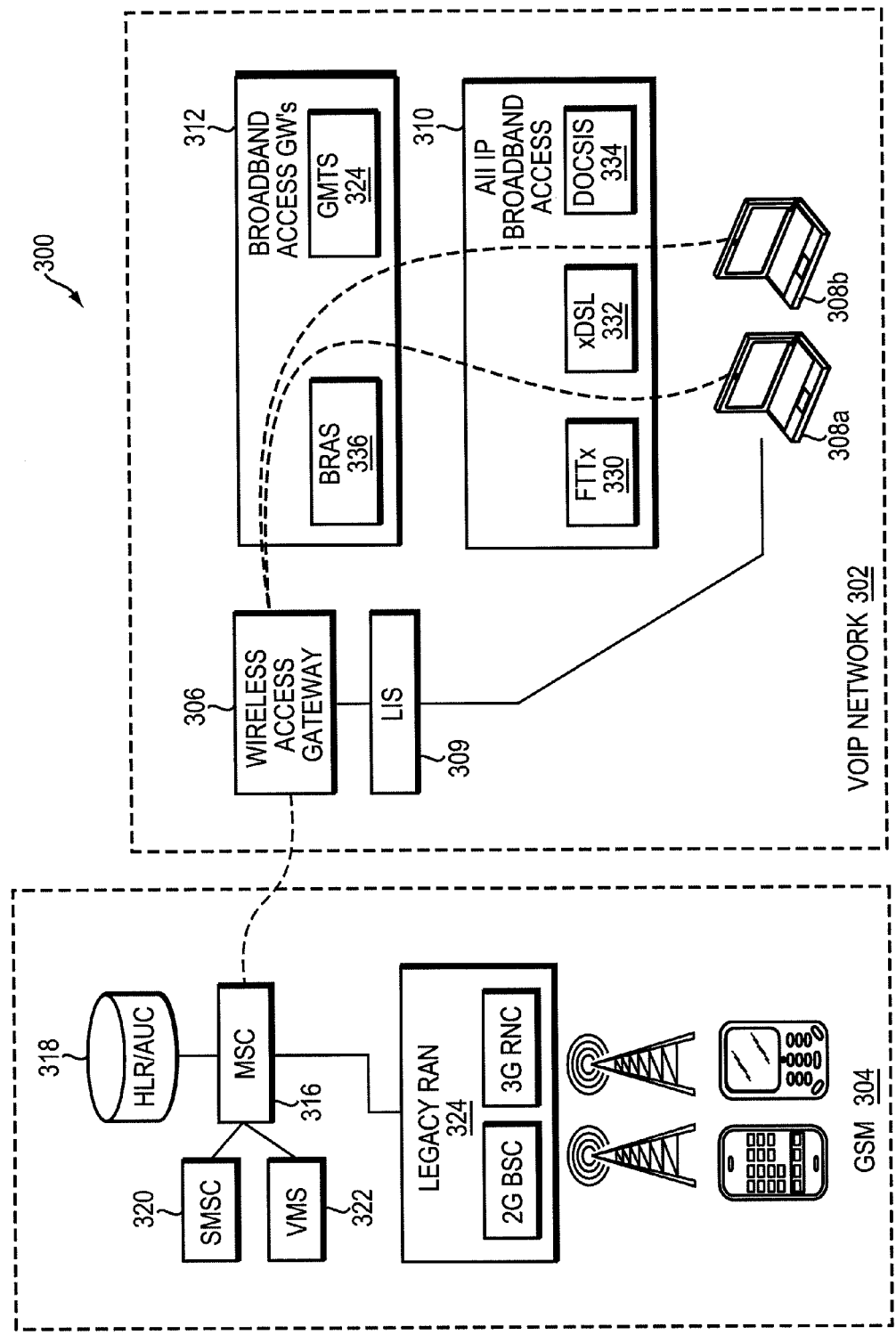
FIG. 3 is a block diagram showing an example of a VOIP network in communication with a GSM via a WAG.

FIG. 3 is a block diagram 300 showing an example of a VOIP network 302 in communication with a GSM 304 via a WAG 306. The VOIP network 302 and the GSM network 304 include network components directed to providing location information of VOIP devices 308a and 308b to a MSC 316. One of ordinary skill in the art can appreciate that that the VOIP network 302 and the GSM network 304 are not limited to the components shown here.

The VOIP network 302 includes location information server (LIS) 309, broadband access communication system 310, broadband network gateway 312, and the WAG 306. The VOIP devices 308a and 308b send data over the broadband access communication system 310 to the broadband network gateway 312. The broadband network gateway 312 routes the data to the WAG 306. The VOIP network 302 can communicate via a SIP and other RFC standards. The LIS 309 is a network node defined in VOIP Emergency call architectures specified by standards such as NENA i2 or NICC 1638. The LIS 309 can store and provide location information for VOIP devices 308a and 308b.

The WAG 306 communicates with the MSC 316 of the GSM network 304. The WAG 306 translates the location information stored in the WAG 306 from a protocol format typically used by the VOIP network 302 into a protocol understood by the GSM network 304. The GSM network 304 includes the MSC 316, a HLR/AUC 318, a Short Message Service Center (SMSC) 320, a Voice Mail Service (VMS) 322, and a RAN 324. The GSM network 304 can communicate via 3GPP standards.

The broadband access communication system 310 can be a Fiber to the x (FTTx) 330, x Digital Subscriber Line (xDSL) 332, or a Data Over Cable Service Interface Specification (DOCSIS) 334. Broadband access gateway 312 can be a broadband remote access server (BRAS) 336, or a cable modem termination system (CMTS) 324.

Determining location information of a VOIP device within a VOIP network can vary between the different types of networks. For example, in a wired network, such as Ethernet or DSL, a wiremap location determination can be used. During a wiremap location determination, the location of a VOIP device can be determined by: 1) finding one or more cables that are used to send packets to the VOIP device, 2) tracing data through aggregation points in the VOIP network (such as Ethernet switches, or DSL access nodes), and 3) finding a port that receives packets from VOIP device. The cable information and the tracing data information can be combined with other data available to the LIS (e.g., data extracted from a database) to determine a final location.

The Internet Engineering Task Force (IETF) has defined architectures and protocols for a WAG to acquire VOIP device location information from a LIS. A LIS within a range of a WAG can be automatically discovered by the WAG, and location information can be retrieved by the WAG using a HELD protocol. Location information can be retrieved directly (known as by value) or the LIS can generate a temporary Uniform Resource Identifier (URI) that can be used to provide location indirectly (known as a location URI).

The location information provided by a LIS can be in a geolocation header format as described by IETF SIP location protocol. The geolocation header can be transmitted in a GEOPRIV header as specified in RFC 4119, for example, to maintain the privacy of the VOIP device user. The RFC 4119 provides a container for both geodetic position and civic address. The civic address in the RFC 4119 can be updated as shown in RFC 5139.

NENA i2 architecture specifies a V0 interface between the VOIP device and the LIS. The V0 interface can be used to provide a VOIP device with information corresponding to a pre-determined storage location within a LIS. The information provided can be in the form of a Location Key (LK) that includes a Client-ID and a LIS-ID. Alternatively, the information provided can be a PIDF-LO containing the actual location, as specified in the NENA architecture.

The NENA i2 architecture also specifies a V3 interface between a VOIP Positioning Centre (VPC) and the LIS. The V3 interface can allow for the VPC to obtain the emergency caller's location. The equivalent name for this interface in the UK NICC standards is Interface (c). This is used when the LIS, provided to the VPC via the V3 interface, contains an LK. The LK is used in obtaining the location from the LIS. The VPC uses the returned location information to obtain routing information from an Emergency Services Zone Routing Database (ERDB).

Figure 4A:
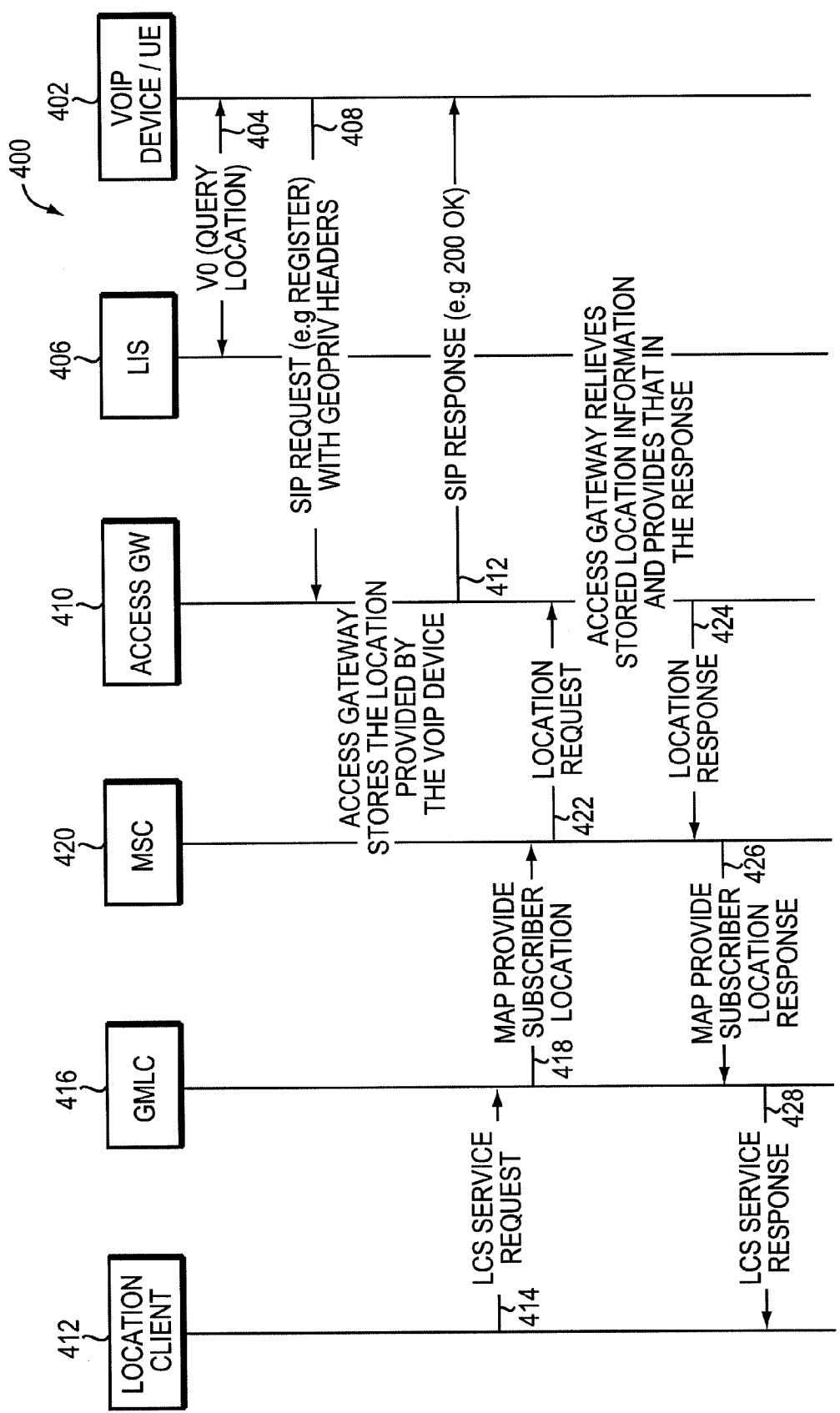
FIG. 4A is a sequence diagram showing a GSM network determining a location of a VOIP device.

FIG. 4A is a sequence diagram 400 showing a GMS network determining a location of a VOIP device 402. A VOIP device 402 is a specific type of UE. A VOIP device 402 queries location information of a physical location 404 from a LIS 406. The VOIP device 402 can query the location over a V0 interface. The VOIP device 402 sends a SIP register request 408 (e.g., call request) with the location information to an access gateway 410 (e.g., WAG 306 as described above in FIG. 3). The access gateway 410 stores the location information.

The access gateway 410 acknowledges the registration of the VOIP device 402 by sending a SIP response (e.g., 200 ok) message 412 back to the VOIP device 402. Subsequently, a location client 412 sends a location services request 414 to a GMLC 416. The GMLC 416 sends a MAP Provide Subscriber Location 418 request to an MSC 420. The MSC 420 sends a location request 422 to the access gateway 410, which retrieves the location information provided in message 408. The location information can be in the form of geolocation headers as described in the RFC. The access gateway translates the retrieved location information into a format that the MSC 420 can understand (e.g., 3GPP protocol format). The access gateway 410 sends a location response 424 to the MSC 420. The MSC 420 sends a MAP Provide Subscriber Location Response 426 to the GMLC 416. The GMLC 416 sends a LCS service response 428 to the location client.

Figure 4B:
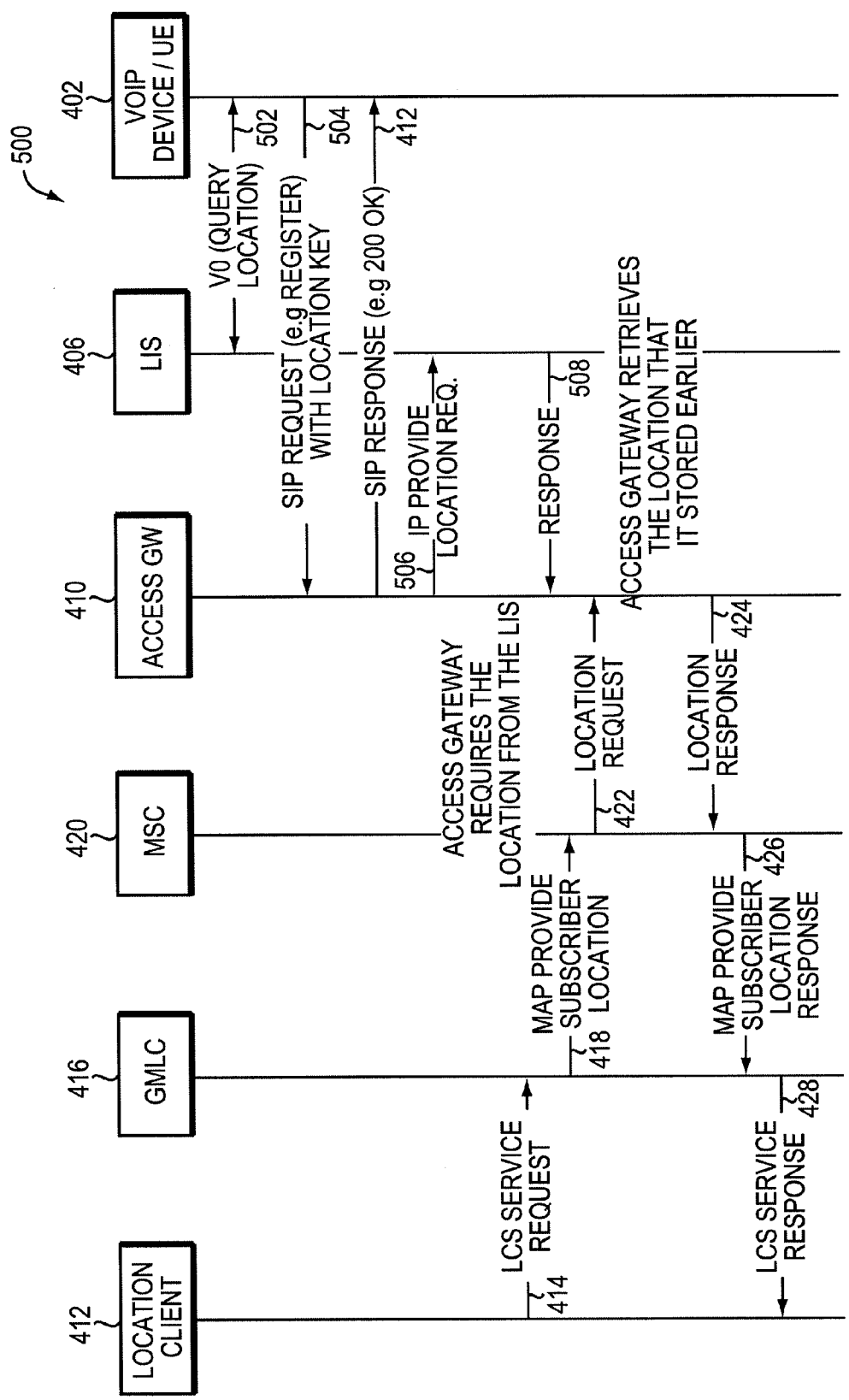
FIG. 4B is another sequence diagram showing a GSM network determining a location of a VOIP device.

FIG. 4B is another sequence diagram 500 of GSM network determining a location of a VOIP device/UE 402. In this embodiment, a VOIP device 402 queries location information of a location key 502 from a LIS 406. The VOIP device 402 sends a SIP register request 504 (e.g., call request) with the location information that includes a location key to an access gateway 410. The access gateway 410 stores location information of a location key. The location is used by the access gateway 410 to identify that it is LIS 406 that serves the VOIP device 402. The access gateway 410 acknowledges the registration of the UE 402 by sending a SIP response (e.g., 200 ok) message 412 back to the VOIP device 402. The access gateway 410 sends an IP provide location query 506 to the LIS 406. The IP provide location query 506 can be communicated via a V3 interface as specified by NENA or Interface (c) as specified by NICC. The LIS 406 sends location response 508 of a physical location to the access gateway 410. Subsequently, the same message flow as is described above in FIG. 4A occurs once the physical location information is stored in the WAG. As described above, a location client 412 sends a location services request 414 to a GMLC 416. The GMLC 416 sends a MAP Provide Subscriber Location 418 request to an MSC 420. The MSC 420 sends a location request 422 to the access gateway 410. The access gateway 410 retrieves the location information provided in message 408. The access gateway translates the retrieved location information into a format that the MSC 420 can understand. The MSC 420 sends a MAP Provide Subscriber Location Response 422 to the GMLC 416. The GMLC 416 sends a LCS service response 424 to the location client.

The access gateway 410 can translate (i.e. interwork) the GEOPRIV headers and the geolocation headers into a BSC format or a RCN format. For example, the geolocation header can be translated into location estimate, positioning data, velocity estimate and GANSS position data parameters as defined by 3GPP TS 48.008. The geolocation header can be translated into any 3GPP location estimate format.

The translation can include converting a civic address to a world geodesic address. The civic address can be in the form of house number, street number, city and state. The world geodesic system address can be in the form of an ellipsoid based system. The access gateway 410 can perform the translation by consulting an internal or external database.

The above described techniques can be implemented in a variety of ways. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described techniques can be implement by Packet-based networks and/or Circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Transmitting devices can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art can appreciate the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of utilizing emergency procedures to determine location information, comprising:
   operating a wireless access gateway to couple a Mobile Switching Center (MSC) in a Global System for Mobile Communication (GSM) network to a broadband access gateway in a Voice Over Internet Protocol Network;
   finding a port within the Voice Over Internet Protocol Network that receives packets from a Voice Over Internet Protocol (VOIP) device coupled to the MSC by the wireless access gateway;
   performing a wiremap location determination based on the found port to determine location information of the VOIP device in the Voice Over Internet Protocol Network;
   storing, by the wireless access gateway, the location information;
   receiving, by the wireless access gateway, a request for a location of the VOIP device from the MSC in said Global System for Mobile Communication (GSM) network;
   translating, by the wireless access gateway, the stored location information into a format used by the MSC in said Global System for Mobile Communication (GSM) network to receive location information for a Radio Access Network (RAN); and
   providing, by the wireless access gateway, the translated location information to the MSC.

2. The method of claim 1 wherein the location information is a physical location of the VOIP device.

3. The method of claim 1 wherein the location information is a location key.

4. The method of claim 3 further comprising querying, by the wireless access gateway, a Location Information Server (LIS) for a physical location of the VOIP device by transmitting the location key to the LIS.

5. The method of claim 1 wherein the stored location information is stored in a format of session initiation protocol's geolocation header.

6. The method of claim 5, wherein translating the stored location information comprises:
   interworking the session initiation protocol's geolocation header into at least one of 3GGP TS 48.008's location estimate, positioning data, velocity estimate, or GANSS positioning data.

7. The method of claim 1 wherein storing the location information further comprises receiving a session initiation protocol's GEOPRIV header from the VOIP device.

8. The method of claim 1 wherein determining the location information further comprises utilizing National Emergency Number Association's enhanced 9-1-1 service for VOIP based network standard.

9. The method of claim 1 wherein determining the location information further comprises utilizing NICC's location for Emergency Calls standard.

10. The method of claim 1 wherein the RAN includes a Base Station Controller (BSC).

11. The method of claim 1 wherein the RAN includes a Radio Network Controller (RNC).

12. A non-transitory computer readable medium storing a computer program product for utilizing emergency procedures to determine location information, the computer program product being operable to cause a wireless access gateway to:
   couple a Mobile Switching Center (MSC) in a Global System for Mobile Communication (GSM) network to a broadband access gateway in a Voice Over Internet Protocol Network;
   find a port within the Voice Over Internet Protocol Network that receives packets from a Voice Over Internet Protocol (VOIP) device coupled to the MSC by the wireless access gateway;
   perform a wiremap location determination based on the found port to determine location information of the VOIP device in the Voice Over Internet Protocol Network;
   store the location information;
   receive a request for a location of the VOIP device from the MSC in said Global System for Mobile Communication (GSM) network;
   translate the stored location information into a format used by the MSC in said Global System for Mobile Communication (GSM) network to receive location information for a Radio Access Network (RAN); and
   provide, by the wireless access gateway, the translated location information to the MSC.

13. The computer program product of claim 12 wherein the location information is a physical location of the VOIP device.

14. The computer program product of claim 12 wherein the location information is a location key.

15. The computer program product of claim 14 further comprising querying, by the wireless access gateway, a Location Information Server (LIS) for the physical location of the VOIP device by transmitting the location key to the LIS.

16. A computer-implemented system for utilizing emergency procedures to determine location information comprising:
   a wireless access gateway coupling a Mobile Switching Center (MSC) in a Global System for Mobile Communication (GSM) network to a broadband access gateway in a Voice Over Internet Protocol Network (VOIP);
   said wireless access gateway finding a port within the Voice Over Internet Protocol Network that receives packets from a Voice Over Internet Protocol (VOIP) device in the Voice Over Internet Protocol Network;
   said wireless access gateway performing a wiremap location determination based on the found port to determine location information of the VOIP device in the Voice Over Internet Protocol Network;
   means for storing, by the wireless access gateway, the location information;
   means for receiving, by the wireless access gateway, a request for a location of the VOIP device from the MSC in said Global System for Mobile Communication (GSM) network;
   means for translating, by the wireless access gateway, the stored location information into a format used by the MSC in said Global System for Mobile Communication (GSM) network to receive location information for a Radio Access Network (RAN); and
   means for providing, by the wireless access gateway, the translated location information to the MSC.

17. The method of claim 1 further including:
   finding one or more cables that are used to send packets to the VOIP device; and
   wherein said wiremap determination is based in part on the found one or more cables that are used to send packets to the VOIP device.

18. The method of claim 17 further including:
   tracing data through aggregation points in the VOIP network; and
   wherein said wiremap determination is based in part on the traced data.

19. The method of claim 1 wherein the VOIP device is a desktop computer.

20. The method of claim 19 wherein the broadband access gateway is a cable modem termination system.

* * * * *